(12) United States Patent
Liu et al.

(10) Patent No.: US 6,532,325 B2
(45) Date of Patent: *Mar. 11, 2003

(54) V-GROOVE DUAL FIBER COLLIMATOR FOR DWDM MULTIPLEXOR/DEMULTIPLEXOR

(75) Inventors: Yugiao Liu, Sunnyvale, CA (US); Peter C. Chang, Mountain View, CA (US)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/736,002

(22) Filed: Dec. 9, 2000

(65) Prior Publication Data

US 2002/0021867 A1 Feb. 21, 2002

Related U.S. Application Data

(63) Continuation-in-part of application No. 09/255,047, filed on Feb. 22, 1999, now Pat. No. 6,246,812, and a continuation-in-part of application No. 09/488,937, filed on Jan. 21, 2000, now Pat. No. 6,396,980.

(51) Int. Cl.[7] ................................................. G02B 6/32
(52) U.S. Cl. .............................. 385/34; 385/24; 385/65; 359/124; 359/131
(58) Field of Search .............................. 385/24, 31, 33, 385/34, 65; 359/124, 131

(56) References Cited

U.S. PATENT DOCUMENTS

| | | | | |
|---|---|---|---|---|
| 5,706,371 A | * | 1/1998 | Pan | 385/11 |
| 5,796,889 A | * | 8/1998 | Xu et al. | 385/24 |
| 5,809,193 A | * | 9/1998 | Takahashi | 385/79 |
| 5,845,023 A | * | 12/1998 | Lee | 385/33 |
| 5,917,626 A | * | 6/1999 | Lee | 359/131 |
| 6,023,542 A | * | 2/2000 | Pan et al. | 385/24 |
| 6,118,910 A | * | 9/2000 | Chang | 385/16 |
| 6,246,812 B1 | * | 6/2001 | Liu et al. | 385/34 |
| 6,272,264 B1 | * | 8/2001 | Li et al. | 385/27 |
| 6,400,862 B1 | * | 6/2002 | Liu et al. | 385/24 |

* cited by examiner

Primary Examiner—Akm E. Ullah
Assistant Examiner—Jennifer Doan

(57) ABSTRACT

A V-groove dual fiber DWDM collimator (1) including an optical lens (10) and a V-groove dual fiber ferrule means (12) fixed with each other. The ferrule means (12) includes a V-groove chip (14) and a cover chip (20) commonly enclosed by a protective guiding sleeve (22) wherein two pigtail fibers (24, 26) are respectively received within the corresponding grooves (16) of the V-groove chip (14). The V-groove ferrule means (12) is itself fixed by adhering its own internal components (14, 20, 22) and the embedded fibers (24, 26), and also fixed to the lens (10).

20 Claims, 3 Drawing Sheets

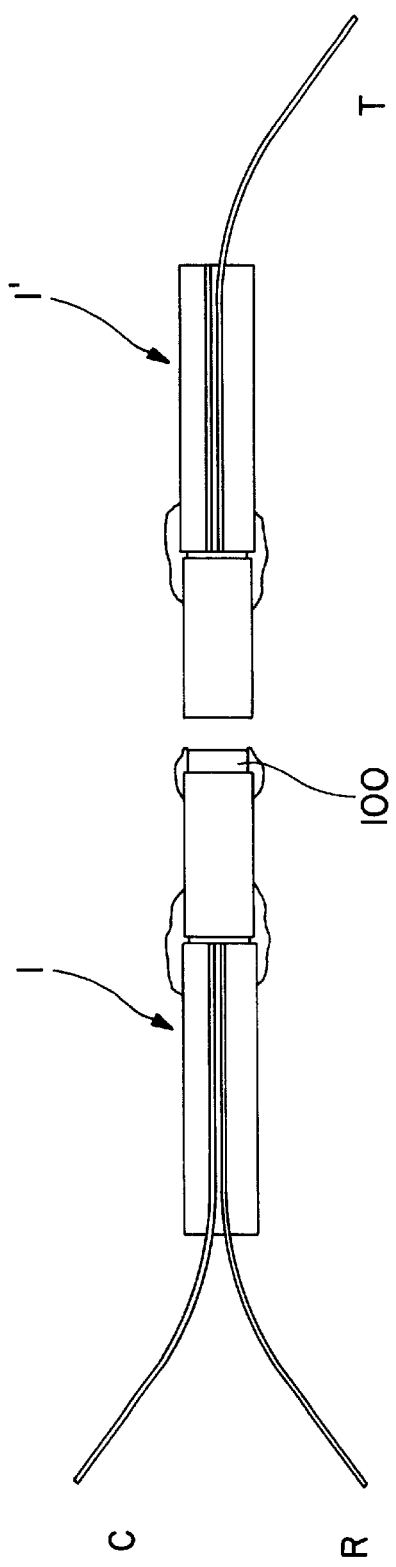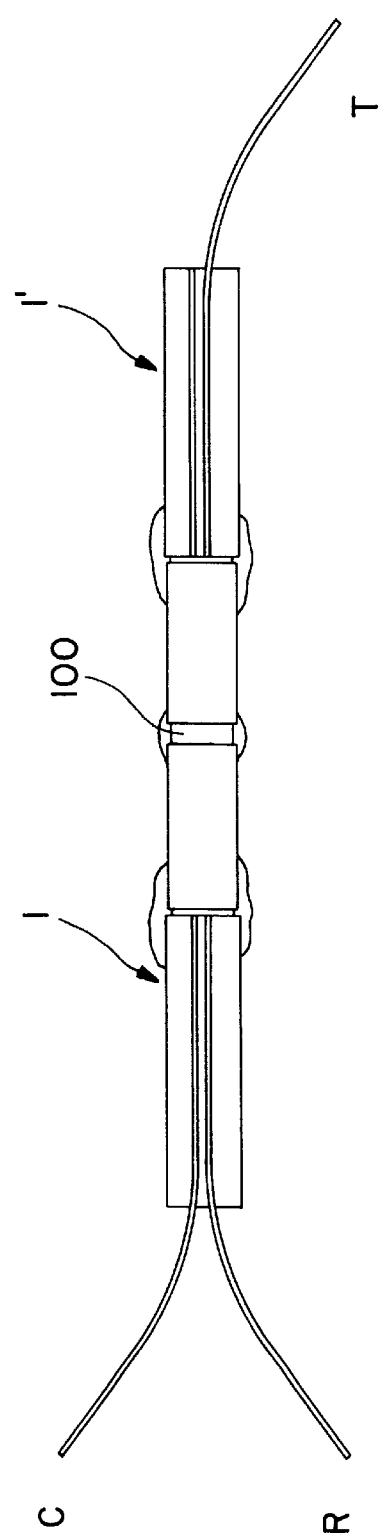

V-GROOVE DUAL FIBER COLLIMATOR FOR DWDM MULTIPLEXOR/DEMULTIPLEXOR

This application is a continuation-in-part of the application Ser. No. 09/255,047 filed on Feb. 22, 1999, now U.S. Pat. No. 6,246,812, and a continuation-in-part of the application Ser. No. 09/488,937 filed on Jan. 21, 2000, now U.S. Pat. No. 6,396,980.

BACKGROUND OF THE INVENTION

1. Field of the Invention

The invention relates to collimators for use with DWDM multiplexors or demultiplexors, and particularly to dual fiber collimators with V-groove positioning devices.

2. The Related Art

As well known, Dense-Wavelength-Division-Multiplexing(DWDM) multiplexors or demultiplexors generally use the optical filter and the fiber optic collimators. Understandably, the collimator(s) used in DWDM applications may be called DWDM collimators specifically to distinguish from other collimators having other usages. In these applications, a band-pass optical filter is employed to multiplex or demultiplex a desired transmission channel of the in-and-out light of the system according to its center wavelength. An international standard wavelength grid has been suggested by International Telecommunication Union (ITU) for the center wavelengths of the DWDM channels. In the DWDM application, the center wavelength of the DWDM optical filter which does not coincide with the ITU standard wavelength, should be tuned to comply therewith. As the center wavelength of the band-pass optical filter depends upon the incident angle of the light that propagates therein, the center wavelength of the band-pass optical filter can be tuned by such an incident angle. The prior art generally uses an Y-branch structure of the three conventional fiber optic collimators wherein the incident angle is tuned by changing the angles between the collimators and thus the center wavelength of such a multiplexor/demultiplexor is adjustably coincident with the desired ITU wavelength. The disadvantage of such design includes difficulties in reducing its size to achieve a robust and compact structure. The related matters may be referred to U.S. Pat. Nos. 4,464,022, 5,204,771, 5,574,596 and 5,845,023, and "compact Polarization-Independent Optical Circulator", Applied Optics, Vol. 20, No. 15, August 1981, pp.2683–2687.

Therefore, it is desired to provide a collimator, for use with DWDM applications, with means which can precisely and efficiently have the filter and the corresponding collimated beam with a required incident angle, thus assuring a desired ITU wavelength can be obtained.

SUMMARY OF THE INVENTION

According to an aspect of the invention, a V-groove dual fiber collimator including an optical lens and a V-groove dual fiber ferrule means fixed with each other. The ferrule means includes a V-groove base chip and a cover chip commonly enclosed by a protective guiding sleeve wherein two pigtail fibers are respectively received within the corresponding grooves of the V-groove chip. The V-groove ferrule means is itself fixed by adhering its own internal components and the corresponding embedded fibers, and also fixed to the lens by adhesive.

Another feature of the invention is to specifically provide a V-groove dual fiber DWDM collimator having the DWDM filter thereof, in which the center wavelength of the DWDM filter could be easily tuned to coincident with the predetermined desired ITU wavelength.

Yet another feature of the invention is to provide a new method/procedure to assemble the filter-lens and the ferrule means in a DWDM collimator, by providing a dense series of ferrule means including different spacing between the corresponding dual fibers thereof, to comply the filter center wavelength with the ITU grid. To achieve a specific channel, first a proper DWDM filter is picked and fixed with the lens, then a specific ferrule means among such dense series, which may almost precisely offset the original deviated center wavelength of the picked DWDM filter to the desired position compliant with the ITU, is selectively to be assembled to the picked filter-lens, thus precisely obtaining the desired DWDM collimator.

BRIEF DESCRIPTION OF THE DRAWINGS

FIG. 6(A) and FIG. 6(B) each shows a side view of an optic assembly including two similar collimators face to face assembled to each other.

DETAILED DESCRIPTION OF THE PREFERRED EMBODIMENTS

Figure 1:
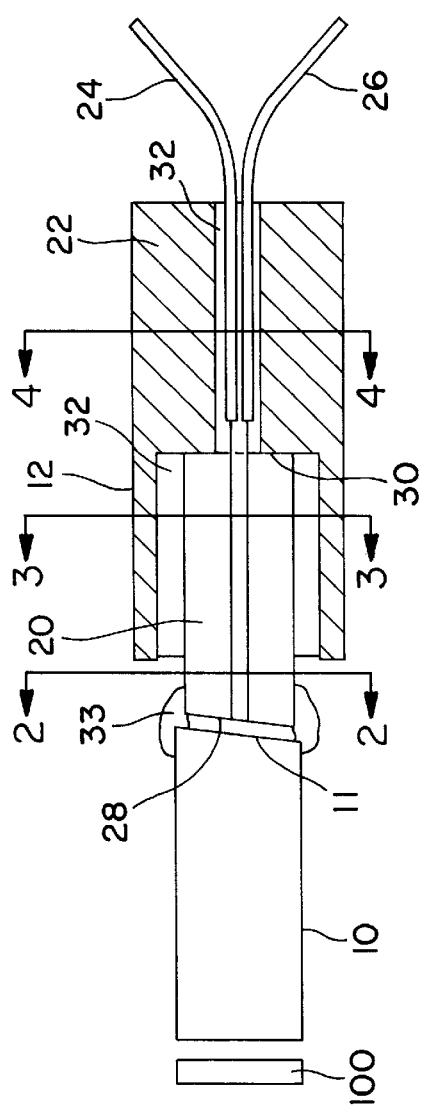
FIG. 1 is a cross-sectional view of a DWDM collimator according to the invention.
Figure 4:
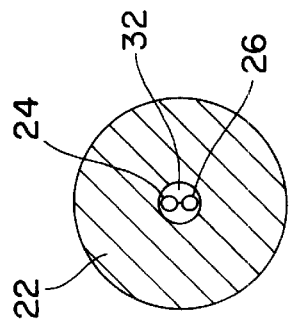
FIG. 4 is a cross-sectional view of the DWDM collimator of FIG. 1 along line 4—4.
Figure 3:
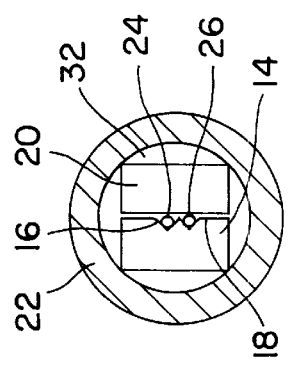
FIG. 3 is a cross-sectional view of the DWDM collimator of FIG. 1 along line 3—3.
Figure 2:
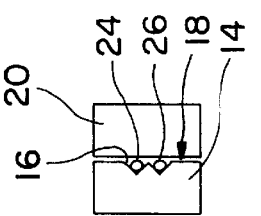
FIG. 2 is a cross-sectional view of the DWDM collimator of FIG. 1 along line 2—2.

References will now be in detail to the preferred embodiments of the invention. While the present invention has been described in with reference to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

It will be noted here that for a better understanding, most of like components re designated by like reference numerals throughout the various figures in the embodiments. Attention is directed to FIGS. 1–4 wherein a V-groove dual fiber (DWDM) collimator 1 is provided for use within a DWDM multiplexor/demultiplexor using optical DWDM filters. For example, in a demultiplexor application, the light coupled therein from the input pigtail fiber of the dual fiber DWDM collimator will be collimated and transmitted to a DWDM optical band-pass filter. The part of the in-pass-band light will pass through the filter as a demultiplexed channel and may be coupled into another collimator or launched to an optical power detector. The part of the out-pass-banc light is coupled back into another pigtail fiber of the dual fiber DWDM collimator and transmitted to the next stage for demultiplexing other channels.

In the presently preferable embodiment, the DWDM collimator 1 includes an optical lens 10 and a V-groove dual fiber ferrule means 12. The V-groove ferrule means 12 comprises a V-groove base chip 14 defining a pair of V-shaped grooves 16 along its upper face 18 and a cover chip 20 positioned on the upper face 18 of the V-groove chip 14, commonly enclosed by a protective guiding sleeve 22. A first optic fiber 24 and a second optical fiber 26 are respectively received within the corresponding V-shaped grooves 16 of the V-groove chip 14 and generally sandwich ed between the V-groove chip 14 and the cover chip 20 wherein the front end of the fibers 24, 26 are polished and terminated around the front end surface 28 of the V-groove chip 14 and the rear end of the fibers 24, 26 extend out of the rear surface 30 of the V-groove chip 14 through the guiding sleeve 22 to an exterior.

FIGS. 6(A) and 6(B) show the subject DWDM collimator 1 and the associated DWDM collimator 1' face to face confront and are aligned and secured to each other to form the whole optical assembly whereby a specific channel can be either added to or dropped from the transmitted signal depending upon usage of either multiplexor or demultiplexor. As shown in both FIGS. 6(A) and 6(B), the associated DVDM collimator 1' includes the similar structures as the subject DWDM collimator 1 except that filter is not a necessity for the associated DWDM collimator 1', and thus both the subject DWDM collimator 1 and the associated DVDM collimator 1' can share the same filter 100 therebetween. In order to have the axes of both subject DWDM collimator 1 and the associated DWDM collimator 1' substantially parallel with each other after the optical alignment, the pigtail fibers should have similar offset from the optical axis respectively, thus the subject DWDM collimator 1 and the associated DWDM collimator 1' are matched with each other in the sense that their fiber spacing of the ferrule means is substantially equal.

It should be noted that the V-groove chip 14, the cover chip 20 and the guiding sleeve 22 and the corresponding embedded fibers 24, 26 may be fixed with each other by adhesive 32. Afterwards, the front end surface 28 of the ferrule means 12 is ground and polished with an angle relative to the axis of the V-groove ferrule means 12 and an anti-reflection coating is then applied thereunto for reducing the back reflection in the pigtail fibers 24, 26. Similarly, the optical lens 10 has a corresponding end surface 11, opposite to said end surface 28 of the ferrule means 12, angled relative to the axis of the optical lens for the same purpose. The ferrule means 12 can be fixed with the lens 10 by the adhesive 33 around its front end, or further by an alignment sleeve enclosing both the ferrule means 12 and the lens 10 therein.

It can be understood that the filter device 100 is positioned at the other end of the lens 10 opposite to the ferrule means 12. Therefore, the space/distance between the fibers 24, 26 in the ferrule means 12 results in a crossing angle between the two collimated in-and-out light beams of the dual fiber collimator 1 through the lens 10. The beam-crossing angle varies in accordance with both the space between the fibers 24, 26 and the focal length of the optical lens 10. Because the focal length of the optical lens is the inherent character of the optical lens which is selectively used in the DWDM collimator 1, then difficulties in controlling the beam-crossing angle of two light beams is concerned about how to obtain the required distance/space between the corresponding two fibers 24, 26. The invention provide a series of V-groove chips 14 with different distances between the spaced parallel V-shaped grooves 18, respectively.

Therefore, by properly selecting the correct corresponding V-groove chip 14 with the required space between the two parallel V-shaped grooves 18 therein, the DWDM collimator 1 may be easily manufactured. Then, by means that the filter 100 is properly aligned to this DWDM collimator 1 at the place where the collimated beams cross, the center wavelength of the demultiplexor could be made to coincide with the predetermined desired ITU wavelength.

It is also noted the distance between the angled end surfaces 11, 28 of the optical lens 10 and the ferrule means 12 is adjusted and the lens 10 and the ferrule means 12 is fixed with each other by adhesive 33 or by an alignment sleeve enclosing both the ferrule means 12 and the lens 10 therein, so that the waists of the two light beams which are collimated into and out of the DWDM collimator 1 may coincide with each other around the place the filter 100 is positioned.

The feature of the invention includes using a chip 14 with a pair of parallel V-shaped grooves with a specific distance therebetween and installing the two separate optical fibers 24, 26 therein to not only easily and quickly, but also efficiently obtain the desired space between these two fibers 24,26. The two V-shaped grooves 16 are configured to precisely define the distance between the two fibers 24, 26 respectively received therein, wherein the depth of the groove 16 may be configured to have the embedded fibers 24, 26 slightly protrude out of the top surface of the chip 14, thus allowing the cover chip 20 may directly confront the fibers 24, 26 and cooperate with the chip 14 to efficiently retainably sandwich the fibers 24, 26 therebetween. The cover chip 20, the guiding 22 sleeve and the adhesive 32 also further provide securement of these two spaced fibers 24, 26 within the DWDM collimator 1.

The invention also discloses provision of a dense series of V-groove ferrules respectively having different distances between the corresponding two parallel fiber pigtail for forming the different DWDM collimators, of which each may tune the angle of the light beam incident on a DWDM optical band-pass filter in a DWDM multiplexor or demultiplexor according to the fiber spacing in the V-groove, thus having the different center wavelength of the optical band-pass filter coincide with that of the ITU grid for the DWDM application.

In comparison with the aforementioned prior art, the invention has a more compact and robust structure. It is also noted that the protective guiding sleeve 22 is used to provide a guide and protection to the fibers 24, 26 extending out of the V-grooves 16 for easy handling and reliable performance.

Figures 5, 5A:
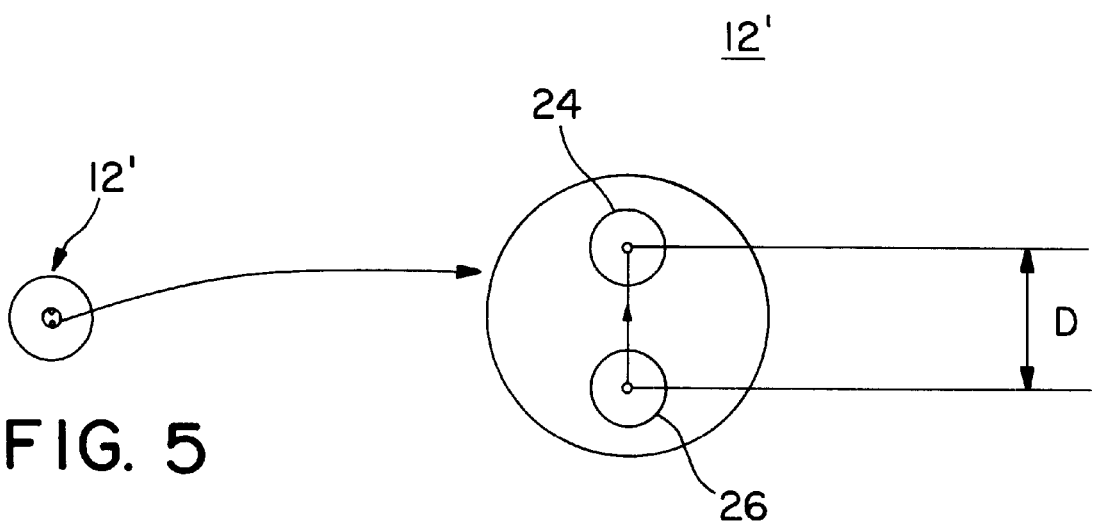
FIG. 5 is a cross-sectional view of a second embodiment of the dual-fiber collimator where the ferrule means is a cylindrical device defining a pair of receiving holes with a predetermined distance therebetween for reception of the pair of fibers therein.
FIG. 5(A) is an enlarged cross-sectional view of the second embodiment of the dual fiber collimator where the two fibers are generally equally spaced from the axis point of the lens by two opposite sides in the radial directions.

FIGS. 5 and FIG. 5A show a second embodiment of the invention where different from the V-grooved ferrule means 12 used in the first embodiment, the ferrule means 12' is of a cylinder shape wherein the pair of fibers 24, 26 are spatially configured in different distances with each other to form a dense series of dual-fiber ferrules. The provision of the dense series of dual-fiber ferrules has a corresponding series of different incident angles realized to tune the center wavelength of a DWDM ban-pass filter to a desired ITU grid wavelength. The inner space of the ferrule means 12' may be occupied with epoxy or other similar material to fixedly maintain such pair of fibers 24, 26 in position. The two fibers 24, 26 with a distance D therebetween, are equidistantly spaced from and by two sides of the imaginarily extending axis point O of the lens 10 in radial directions so that the collimated light beams on the other side of the lens cross with each other on the optical axis with substantially the same angle.

Understandably, one feature of the invention is to provide a dense series of dual-fiber ferrule means defining different spaces between the corresponding pairs of fibers thus precisely tuning out the required center wavelengths of the filter to coincide with the standard ones. In brief, in the invention with such dense series of various dual-fiber ferrule means having different spacing distance between two fibers available, the DWDM collimator manufacturer or designer can easily find/select the proper one of those ferrule means to comply with the filter for making the whole DWDM collimator assembly which defines a center wavelength coincident with the designated standard one. The invention is to modularize a dense series of ferrule means to comply with the filter wherein the filter and the lens generally have been pre-assembled together as one piece subassembly. Different from the invention, the traditional DWDM collimators are made by, without a dense series of modularized ferrule means, imposing a very stringent requirement on the center wavelength tolerance of the filter to get the assembled DWDM collimator center wavelength reasonably close to the ITU grid. Understandably, modularization of a dense series of ferrule means is one important feature of the invention.

On the other hand, another feature of the invention which may optionally incorporate the aforementioned feature, is to use the pair of V-shaped grooves in a ferrule means for easily positioning the fibers therein and making a low cost dual-fiber collimator thereby. Understandably, this feature may also be applied to other optic devices not requiring tuning center wavelength of the filter, such as FVDM device, gain flattening devices in EDFA, or various band split filter devices which still requires dual fibers thereof.

It is contemplated that in the invention because of provision of a dense series of dual-fiber ferrule means with a plurality of different spacing between the corresponding dual fibers, it allows to delicately adjust the filter with high precision to precisely comply with the desired ITU center wavelength. Additionally, because of provision of a dense series of dual-fiber ferrule means with a plurality of different spacing covering a relatively great range, a same filter might be adjusted by offset function provided by the ferrule means to diverse/different center wavelengths of the ITU grid. In brief, by using the lens-filter as the mating basis and selecting the proper one from a dense series of ferrule means to precisely obtain the desired ITU channel, provides a flexible/diverse, accurate and low cost manufacturing system for DWDM collimators and thus DWDM multiplexors and demultiplexors.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included in the scope of the following claims.

We claim:

1. A dual fiber collimator comprising:
   an optical lens; and
   a ferrule means coaxially aligned with said lens and defining a pair of spaced pigtail optical fibers with a specific distance therebetween, wherein the lens and the ferrule means are retained in position relative to each other so that the signals transmitted by said pair of fibers may precisely travel through the lens in predetermined paths or angles thereof by controllably select the proper said specific distance.

2. The dual fiber collimator as described in claim 1, wherein a filter is positioned beside the lens opposite to the ferrule means, thus making a precisely controllable incident angle thereof, and a center wavelength of a bandpass filter can be made to coincide with a required standard one.

3. The dual fiber collimator as described in claim 2, wherein the ferrule means includes a first chip in which a pair of V-shaped grooves is formed around an upper surface thereof, and a second chip covering said fist chip and cooperating with said first chip to sandwich the fibers inside the V-shaped grooves therebetween.

4. The dual fiber collimator as described in claim 3, wherein a protective guiding sleeve surrounds the first and second chips.

5. The dual fiber collimator as described in claim 4, wherein adhesive is applied to the ferrule means.

6. A method for making a dual fiber collimator, comprising steps of:
   providing an optical lens;
   providing a ferrule means defining a pair of spaced pigtail optical fibers with a specific distance therebetween;
   coaxially aligned the ferrule means with said lens in position relative to each other so that the signals transmitted by said pair of fibers may precisely travel through the lens in predetermined paths or angles thereof by controllably select the proper said specific distance; and
   fixing the optical lens and the ferrule means together.

7. The method as described in claim 6, further comprising a step of providing the ferrule means with a first chip in which a pair of V-shaped grooves are formed, and a second chip covering said first chip for retainably holding the fibers inside the V-shaped grooves therebetween.

8. The method as described in claim 7, wherein a protective guiding sleeve encloses both the first and second chips.

9. The method as described in claim 6, further including providing a filter beside the lens opposite to the ferrule means so that the light coupled in from the pigtail fibers can have a precisely controllable incident angle thereof, and a center wavelength of a bandpass filter can be made to coincide with a required standard one.

10. A method for making a dual fiber collimator, comprising steps of:
    providing an optical lens;
    providing a series of ferrule means respectively with pairs of spaced fibers with different distances therebetween from one another;
    selecting one of said ferrule means by referring to a focal length of said optical lens so as to provide a desired incident angle of a light beam when said light beam passes through a filter; and
    fixing the optical lens and the selected ferrule means so that the desired incident angle of the light beam collimated by the collimator, results in a center wavelength of the filter being coincident with a required standard one.

11. The method as described in claim 10, wherein each of said ferrule means defines a pair of V-grooves therein.

12. The method as described in claim 10, wherein the fibers are retainably embedded within the corresponding ferrule means by means of occupying material therebetween.

13. A system for making a collimator comprising:

an optical lens;

a filter fixed on one side of the lens to form a lens-filter subassembly; and one of a dense series of modularized ferrule means selectively positioned on the other side of the lens, said modularized ferrule means respectively including pairs of built-in optical fibers with different distances therebetween from one another; wherein said selected one of the modularized ferrule means defines the distance between the corresponding pair of optical fibers to comply with the lens-filter so as to tune the center wavelength of the filter to coincident with a required standard one.

14. The system as described in claim 13, wherein each of said modularized ferrule means defines a pair of V-grooves therein to precisely position the corresponding pair of optical fibers in position.

15. The system as described in claim 13, wherein each of said modularized ferrule means retainably embeds the corresponding pair of optical fibers in position by means of occupying material thereabout.

16. A method of assembling an optical component assembly comprising:

providing a first subassembly and a second subassembly head to head positioned with each other;

providing said first subassembly with a lens and a ferrule from a series of ferrule means respectively with pairs of spaced fibers having different distances therebetween from one another;

providing said second subassembly with a lens and a ferrule from a series of ferrule means respectively with pairs of spaced fibers having different distances therebetween from one another;

selecting the first and the second subassembly to match with each other according to the spacings of the pairs of fibers in their ferrule respectively for transmitting light therebetween.

17. The method as described in claim 16, wherein at least one filter is positioned in between the lenses of the first and the second subassembly.

18. A method of precisely obtaining a channel from a signal in a DWDM collimator, comprising the steps of:

(a) providing a lens with thereabouts a filter which inherently defines a center wavelength which is close to but with an offset from a desired standard center wavelength grid such as defined by ITU;

(b) providing a dense series of dual-fiber ferrule means each with therein a pair of fibers defining a spacing different from one another;

(c) selecting only a proper one in said dense series of dual-fiber ferrule means, in which the spacing between the pair of fibers precisely compensates said offset to tune the center wavelength of the filter substantially meet said desired standard center wavelength, and the channel at said center wavelength can be filtered out;

(d) securing the lens and said specifically selected dual fiber ferrule means together.

19. The method as described in claim 18, wherein said filter is first substantially directly attached to a front surface of the lens.

20. The method as described in claim 18, wherein said filter is first directly attached to another lens of another collimator, and then successively sandwiched between the lens and said another lens when said collimator and said another collimator are assembled together.

* * * * *